United States Patent
Long

(10) Patent No.: US 11,260,720 B2
(45) Date of Patent: *Mar. 1, 2022

(54) MOTOR CONTROLLER OPERATION-DEPENDENT THERMAL MANAGEMENT SYSTEM

(71) Applicant: Wisk Aero LLC, Mountain View, CA (US)

(72) Inventor: Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 16/425,677

(22) Filed: May 29, 2019

(65) Prior Publication Data
US 2019/0315188 A1    Oct. 17, 2019

Related U.S. Application Data

(63) Continuation of application No. 15/838,779, filed on Dec. 12, 2017, now Pat. No. 10,350,960.

(51) Int. Cl.
| | |
|---|---|
| *B60H 1/00* | (2006.01) |
| *H01M 10/613* | (2014.01) |
| *H01M 10/625* | (2014.01) |
| *H01M 10/663* | (2014.01) |
| *B64D 27/24* | (2006.01) |
| *H01M 10/615* | (2014.01) |
| *H01M 10/6551* | (2014.01) |
| *H01M 10/6563* | (2014.01) |
| *B64C 29/00* | (2006.01) |
| *B64C 27/02* | (2006.01) |

(52) U.S. Cl.
CPC ..... *B60H 1/00392* (2013.01); *B64C 29/0025* (2013.01); *B64D 27/24* (2013.01); *H01M 10/613* (2015.04); *H01M 10/615* (2015.04); *H01M 10/625* (2015.04); *H01M 10/6551* (2015.04); *H01M 10/6563* (2015.04); *H01M 10/663* (2015.04); *B64C 27/027* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 9,572,552 B1 * | 2/2017 | Bodor | H01M 10/6572 |
| 9,783,288 B1 * | 10/2017 | Moore | B64C 27/48 |
| 10,350,960 B1 | 7/2019 | Long | |

OTHER PUBLICATIONS

U.S. Appl. No. 15/838,779, "Final Office Action", dated Jul. 27, 2018, 9 pages.

(Continued)

*Primary Examiner* — Zhongqing Wei
(74) *Attorney, Agent, or Firm* — Kilpatrick Townsend & Stockton LLP

(57) ABSTRACT

A coupled battery and motor controller thermal management system is disclosed. In various embodiments, a motor controller and a heat sink are coupled thermally to a battery. At least a portion of waste heat generated by the motor controller is transferred to the thermal mass of the battery during at least a first mode of operation in which a relatively low amount of ambient air flows through the heat sink.

19 Claims, 4 Drawing Sheets

(56) References Cited

OTHER PUBLICATIONS

U.S. Appl. No. 15/838,779, "Non-Final Office Action", dated Mar. 22, 2018, 13 pages.
U.S. Appl. No. 15/838,779, "Notice of Allowance", dated Mar. 11, 2019, 8 pages.

* cited by examiner

MOTOR CONTROLLER OPERATION-DEPENDENT THERMAL MANAGEMENT SYSTEM

CROSS REFERENCE TO OTHER APPLICATIONS

This application is a continuation of co-pending U.S. patent application Ser. No. 15/838,779 entitled COUPLED BATTERY AND MOTOR CONTROLLER THERMAL MANAGEMENT SYSTEM filed Dec. 12, 2017 which is incorporated herein by reference for all purposes.

BACKGROUND OF THE INVENTION

Vertical (and/or short) takeoff and landing (VTOL) electric aircraft may use a plurality of lift fans, powered by electric motors, to take off, hover, and/or land. After takeoff and transition to forward flight, one or more propellers optimized for forward flight may be used. During takeoff and transition to forward flight, for example, typically on the order of 60 seconds or less, the power electronics of the lift motor controllers may dissipate several kilowatts of waste heat. Once the vehicle is flying, the lift motors may no longer be used until the aircraft lands (typically at least several minutes after takeoff).

In a typical electric vehicle, such as an electric car, the motor controllers would be cooled with a heat sink that directly transfers the waste heat to the ambient air. Alternatively, a liquid coolant can be used to transfer the heat away from the motor controllers, and then it is transferred to the ambient air using a radiator and fan. With both of these systems, the weight of the thermal management system can be substantial. If these typical approaches were used on an electric aircraft, they would have to be sized for the peak power dissipation (several kilowatts), even though that power dissipation happens over a relatively very short period of time. During takeoff, for example, the rate at which thermal energy is being dissipated may be quite large, although the total amount of thermal energy that is being dissipated is not very large.

As is generally true with aircraft, minimizing unnecessary weight can greatly increase performance, so minimizing the weight of components used to provide motor controller thermal management is advantageous.

BRIEF DESCRIPTION OF THE DRAWINGS

Various embodiments of the invention are disclosed in the following detailed description and the accompanying drawings.

DETAILED DESCRIPTION

Figure 1A:
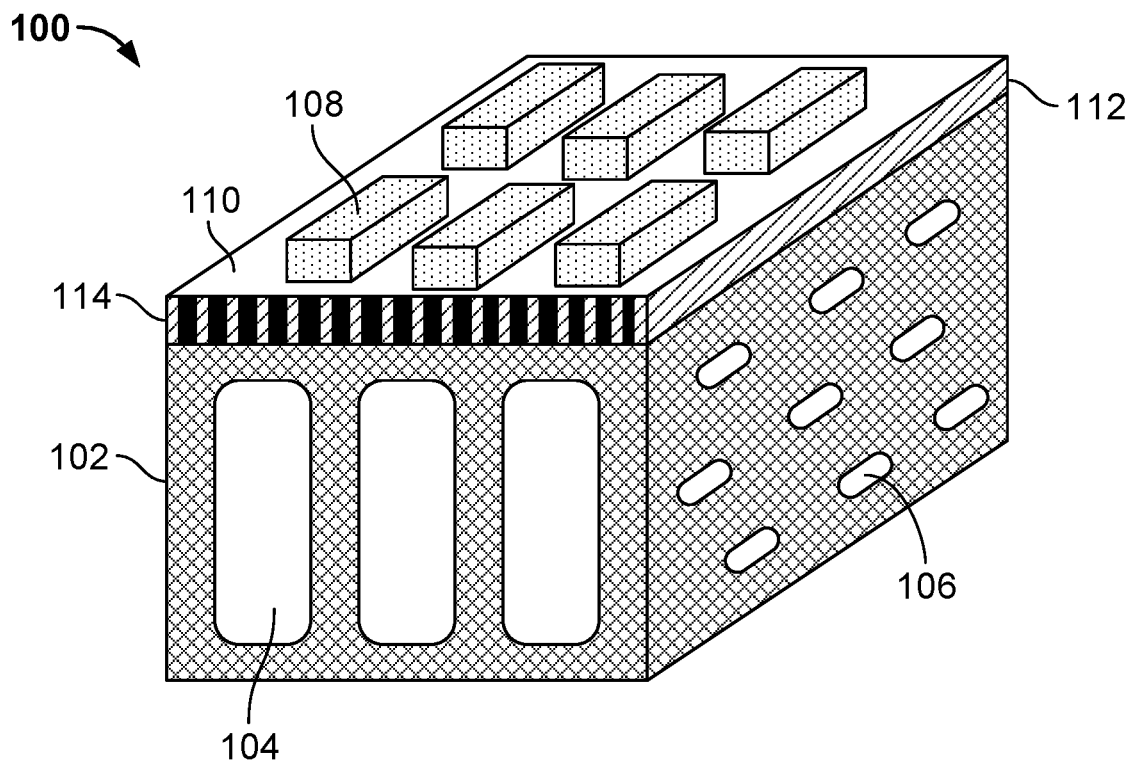
FIG. 1A is a diagram illustrating an embodiment of a coupled battery and motor controller thermal management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A coupled battery and motor controller thermal management system is disclosed. In various embodiments, a motor controller is coupled thermally to the thermal mass of a battery. During at least some phases of operation, the motor controller generates more waste heat than is capable of being transferred to the ambient air. During such a phase of operation, waste heat is transferred from the motor controller(s), directly in some embodiments or indirectly via a heat sink and/or other structures in other embodiments, to the thermal mass of the battery. In a later phase of operation, heat is transferred from the thermal mass of the battery to the ambient (cooling) air. In various embodiments, a heat sink may be provided to facilitate heat transfer from the thermal mass of the battery to the ambient air.

In some embodiments, a coupled battery and motor controller thermal management system as disclosed herein is implemented in a vertical takeoff and landing (VTOL) electric aircraft. Electric motor driven lift fans are used to take off, hover, and land. Separate propellers optimized for forward flight are used for forward flight, e.g., once the aircraft is in the air. Motor controllers as described herein supply current to the motors that drive the lift fans, and as a result generate large amounts of heat quickly, but for a short duration, e.g., during takeoff, lading, and/or hover. Heat is transferred to the thermal mass of a battery to which the motor controllers are thermally coupled, and is transferred later from the thermal mass of the battery to the ambient air, e.g., during forward flight. In some embodiment, during forward flight air flows (more) through a heat sink adjacent to the battery (and, in some embodiments, the motor controller) and facilitates heat transfer from the thermal mass of the battery to the ambient air.

In various embodiments, techniques disclosed herein reduce the weight of the motor controller cooling system by using the thermal mass of the battery to store the waste heat during the vertical takeoff and landing events, for example, or hover. The thermal mass of the batteries is large enough, and the total energy during VTOL operations is low enough (because they are relatively short duration), that the resulting temperature rise of the batteries is well within the acceptable operating range of the battery. The temperature rise of the battery, in various embodiments, is approximated by the following equation:

$$\text{delta}T = P\text{dissipated} * \text{duration}/(C*M)$$

where delta T is the temperature rise of the battery, Pdissipated is the waste heat power of the motor controllers during VTOL, duration is the duration of the VTOL phase of flight, C is the specific heat capacity of the batteries and M is the mass of the batteries. By way of example, in an electric VTOL aircraft with 8 lift fans, typical values for these parameters are 400 W for each of 8 VTOL motor controllers for a total of 3.2 kW, a VTOL duration of 90 seconds, battery specific heat of 900 J/(kg*K), and a battery mass of 70 kg. For these values, the temperature rise of the battery would be less than 5 degrees C., which is an acceptably low value.

In various embodiments, using the battery as a heat sink as disclosed herein may improve battery performance, e.g., by maintaining the battery within an optimal temperature range, such as 20 degrees to 50 degrees C.

The weight of a forced air convection heat sink can be roughly approximated with a figure of merit (FOM):

$$FOM = \text{weight} * T\text{rise}/P\text{dissipated}$$

where the weight in this case is the weight of the heat sink fins, mounting plates and fan (for embodiments in which the heat sink includes a fan), and Trise is the acceptable temperature rise of the hot side with respect to the ambient temperature. A reasonable value for this figure of merit is about 0.07 kg*K/W. That means the weight of a heat sink for 8 motor controllers where the acceptable temperature rise is 80 K would be about (0.07 kg*K/W)*(8*400 W)/80K=2.8 kg.

If for instance, the heat were stored in the thermal mass of the battery and then dissipated over a 9000 second duration rather than a 90 second duration, the heat sink would have to only be sized for Pdissipated=4 W. If we also assume that the battery cell max temperature cannot exceed 60 deg C. and the ambient temperature is 40 deg C. (a Trise of 20 deg C.), then the heat sink weight would only have to be (0.07 kg*K/W)*(8*4 W)/20K=0.11 kg. This is a potential weight savings of more than 2.6 kg, which is substantial.

The above examples and associated calculations are intended only to show the approximate benefits of the techniques disclosed herein and do not replace the more detailed calculations that an engineer familiar with the state of the art would perform in applying techniques disclosed herein to a specific aircraft design. The 4 W heat sink in the rough calculation above may be quite small and the figures in this disclosure do not necessarily represent a heat sink of this size. In fact, in some cases the required heat dissipation may be so low that convection off the outer surfaces of the motor controller and battery may be sufficient such that a separate heat sink may not be required.

In various embodiments, a battery/controller system that embodies a coupled battery and motor controller thermal management system as disclosed herein may be located in the airflow path between an inlet duct on the exterior of the aircraft (e.g., the underside of the fuselage) and an outlet duct. The forward flight of the aircraft induces airflow through the inlet duct, through the battery/controller system, and through the outlet duct where it leaves the aircraft. In alternate configurations, this flow could be augmented or solely induced by a single fan or multiple fans in the ducts.

FIG. 1A is a diagram illustrating an embodiment of a coupled battery and motor controller thermal management system. In the example shown, battery/motor controller assembly 100 includes a battery 102 that contains, e.g., a plurality of battery cells. Battery 102 may comprise a battery pack that includes a plurality of battery cans, canisters, or other containers, each including a plurality of pouch type cells. Battery 102 includes in this example three access panels 104, e.g., to load, inspect replace, service, or otherwise access battery cells contained in 102. Battery 102 in the example shown also includes a plurality of sealed pressure relief apertures 106. In various embodiments, a sudden buildup of pressure inside the battery 102 may result in the seals of apertures 106 being blown out/open, enabling pressure to be released without damage to structures surround the battery 102. For example, in the event of battery thermal runaway, a battery cell may explode and/or give off large amounts of heat. The apertures 106 in various embodiments allow heat and/or pressure to dissipate without damage to surrounding structures.

In the example shown in FIG. 1A, a plurality of motor controllers 108 are mounted on a thermally conductive mounting plate 110 comprising a heat sink 112. A plurality of heat conducting fins 114 are mounted between the mounting plate 110 and a lower mounting plate of heat sink 112 (not shown) and/or directly to an upper surface of battery 102. In various embodiments, airflow over the fins 114 draws heat out of both of the mounting plates. Heat can also flow from one mounting plate to the other. In various embodiments, air channels defined by the respective adjacent fins 114 allow air to flow through the heat sink 112, e.g., during forward flight.

Six motor controllers 108 are shown in FIG. 1A. In various embodiments, each lift fan motor or other motor comprising an electric aircraft or other electric vehicle may have a corresponding motor controller 108, and the number of controllers in any given vehicle may be determined by the number of motors required to be driven.

Figure 1B:
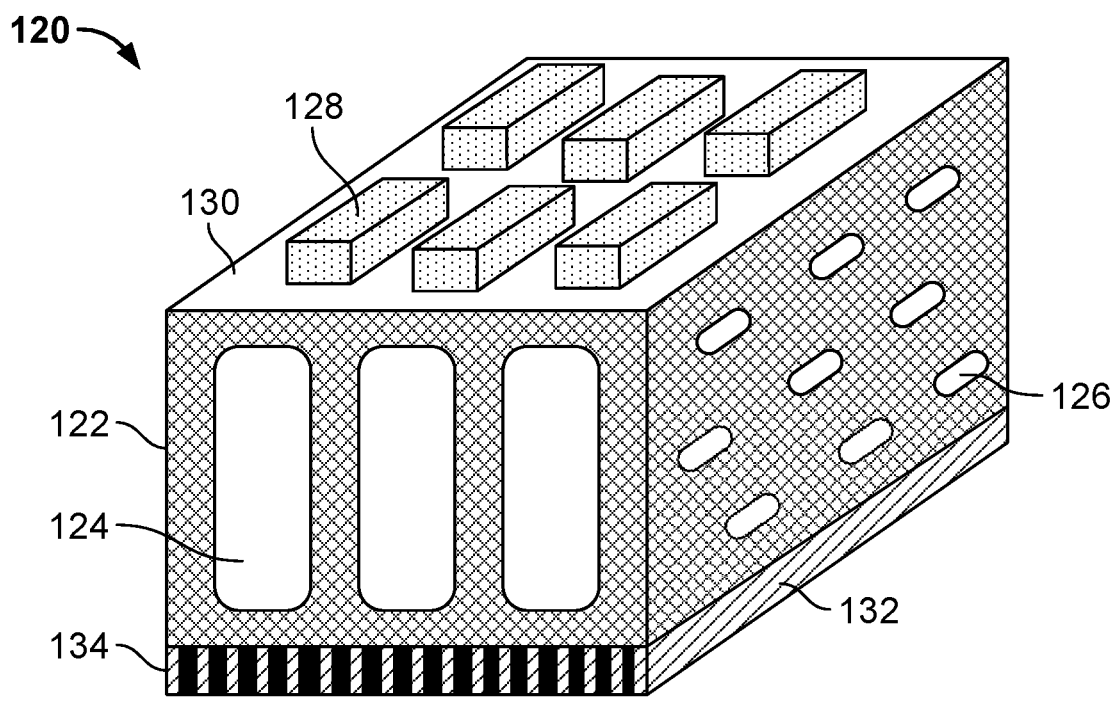
FIG. 1B is a diagram illustrating an alternative embodiment of a coupled battery and motor controller thermal management system.

FIG. 1B is a diagram illustrating an alternative embodiment of a coupled battery and motor controller thermal management system. In the example shown in FIG. 1B, the motor controllers 128 of battery/motor controller assembly 120 are thermally connected directly to the battery 122 (comprising access panels 124 and apertures 126) such that waste heat is conducted directly to the battery, via mounting plate 130, without passing through the heat sink. The heat sink 132 comprising fins 134 is thermally connected directly to the battery, at the bottom of the battery 122 in this example. The configuration shown in FIG. 1B would enhance heat conduction from the motor controller to the battery, but would force the heat conduction path from the motor controller to the heat sink to go through the battery.

In various embodiments, the battery cells comprising batteries such as batteries 102, 122 are pouch cells with their tabs facing downward where the cells are electrically interconnected. In some embodiments, the cells are interleaved with aluminum sheet metal parts that are thermally connected to the bottom mounting plate of the heat sink (or the top mounting plate in the case of a heat sink mounted at the bottom of the battery, as in FIG. 1B). This configuration enhances the thermal conduction between the heat sink bottom mounting plate and the thermal mass of the battery cells.

In various embodiments, when there is little or no airflow through the heat sink, the waste heat of the motor controllers will be conducted through the heat sink and into the thermal mass of the battery cells. For an electric VTOL aircraft, this case approximates the situation during vertical takeoff, hover and vertical landing, when there is not forward velocity of the aircraft (assuming there is also no fan forcing air through the heat sink; in some embodiments, the heat sink does not include a fan; in some embodiments the heat sink includes one or more fans but they are not operated during takeoff, for example).

In an alternate configuration, the sheet metal parts that conduct heat into the battery pack could be enhanced or replaced with heat pipes (either of the planar, linear or other variety). In still another alternate configuration, thermoelectric coolers using the Peltier effect could be added to help pump heat out of the motor controllers and into the battery. This configuration has an added benefit in that the thermoelectric cooler can pre-cool the motor controller, which lowers its internal resistance and thus lowers its losses. This results in higher efficiency and less waste heat to pump away.

Referring further to FIG. 1B, in some embodiments, the heat dissipation required during forward flight to dissipate the heat transferred to the thermal mass of the battery is sufficiently low that convection off the outer surfaces of the motor controller and battery are sufficient to dissipate the heat. In some such embodiments, a separate heat sink may not be required. As a result, in some alternative embodiments to the example shown in FIG. 1B, the heat sink 132 is omitted.

Figure 2A:
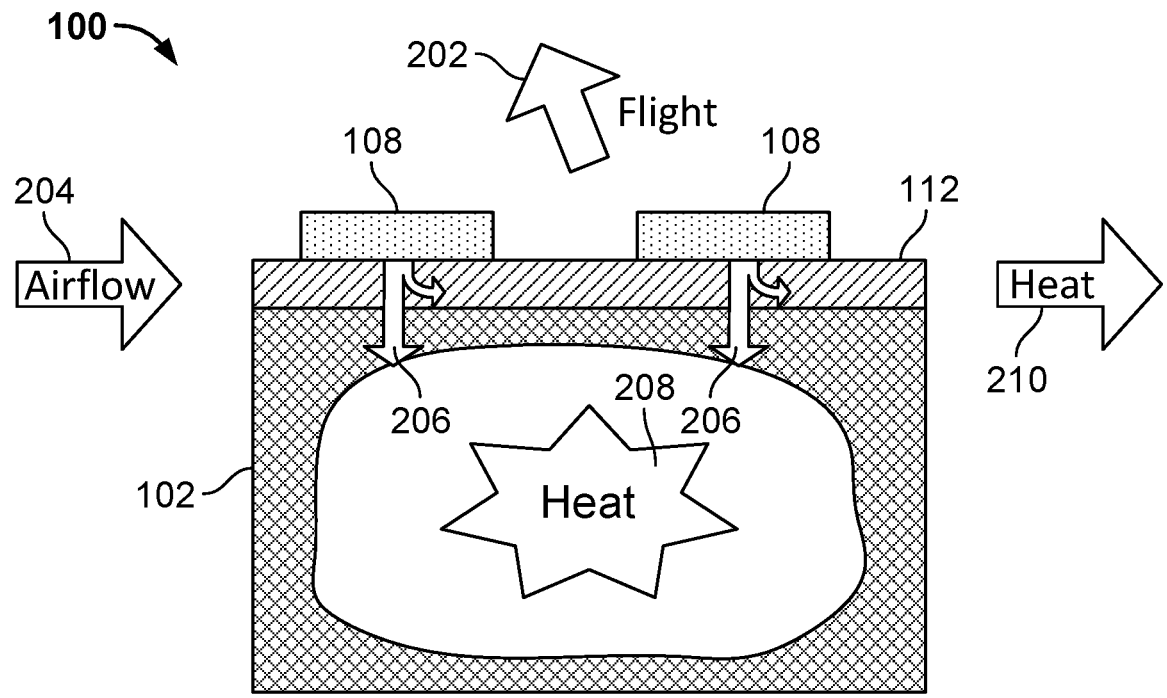
FIG. 2A is a diagram illustrating an embodiment of a coupled battery and motor controller thermal management system in a vertical flight mode of operation.

FIG. 2A is a diagram illustrating an embodiment of a coupled battery and motor controller thermal management system in a vertical flight mode of operation. In the example shown, the direction of flight is indicated by arrow 202. For example, during vertical takeoff an aircraft in which the battery/motor controller assembly 100 is included may have slight forward motion but primarily vertical motion. The airflow through the heat sink 112 under the conditions shown in FIG. 2A is represented by arrow 204. The relatively low amount of airflow 204 through heat sink 112 result, in this example, in the majority of waste heat 206 generated by the controllers 108 being conducted to the thermal mass of battery 102, resulting in an amount of heat 208 being transferred to the battery 102, which raises the internal temperature of battery 102. A relatively small amount of the heat, in this example, is transferred to the environment in the form of the heated outlet airflow 210. In various embodiments, the heat sink 112 is designed such that most of the heat (206, 208) is conducted into the thermal mass of the battery, but some is transferred to the coolant air (204, 210).

In various embodiments, during transition from vertical flight to forward flight when there is some induced cooling airflow, the waste heat of all of the motor controllers is mostly conducted into the thermal mass of the battery cells, but some is drawn away in the coolant airflow.

In some embodiments, after the transition to forward flight is complete, the lift motor controllers are off and no longer dissipate any heat. The thermal energy that has been stored in the thermal mass of the batteries continues to flow out of the batteries and into the coolant air. This process continues, and over the course of several minutes the battery continues to cool until it is nearly equal to the ambient air temperature.

In various embodiments, during forward flight, when there is substantial induced cooling airflow and no motor controller waste heat, the thermal energy that was stored in the battery cells is drawn away in the coolant airflow.

Figure 2B:
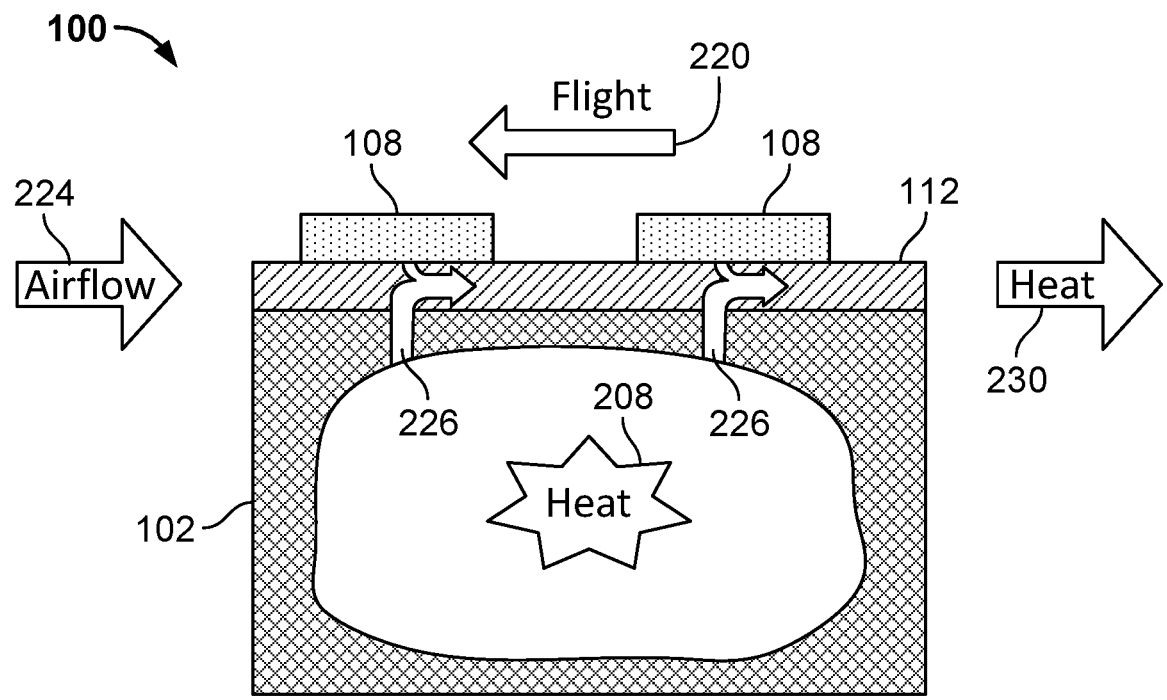
FIG. 2B is a diagram illustrating an embodiment of a coupled battery and motor controller thermal management system in a forward flight mode of operation.

FIG. 2B is a diagram illustrating an embodiment of a coupled battery and motor controller thermal management system in a forward flight mode of operation. In the example shown, the arrow 220 indicates the aircraft is in forward flight resulting in airflow 224 through heat sink 112. In the example shown, the lift fans are off and only residual heat is transferred to the cooling airflow via heat sink 112. The increase airflow 224 through heat sink 112 allows heat 208 in the thermal mass of battery 102 to be conducted 226 to the heat sink 112 and transferred to the cooling airflow through heat sink 112 and carried away in heated outlet airflow 230.

Figure 3A:
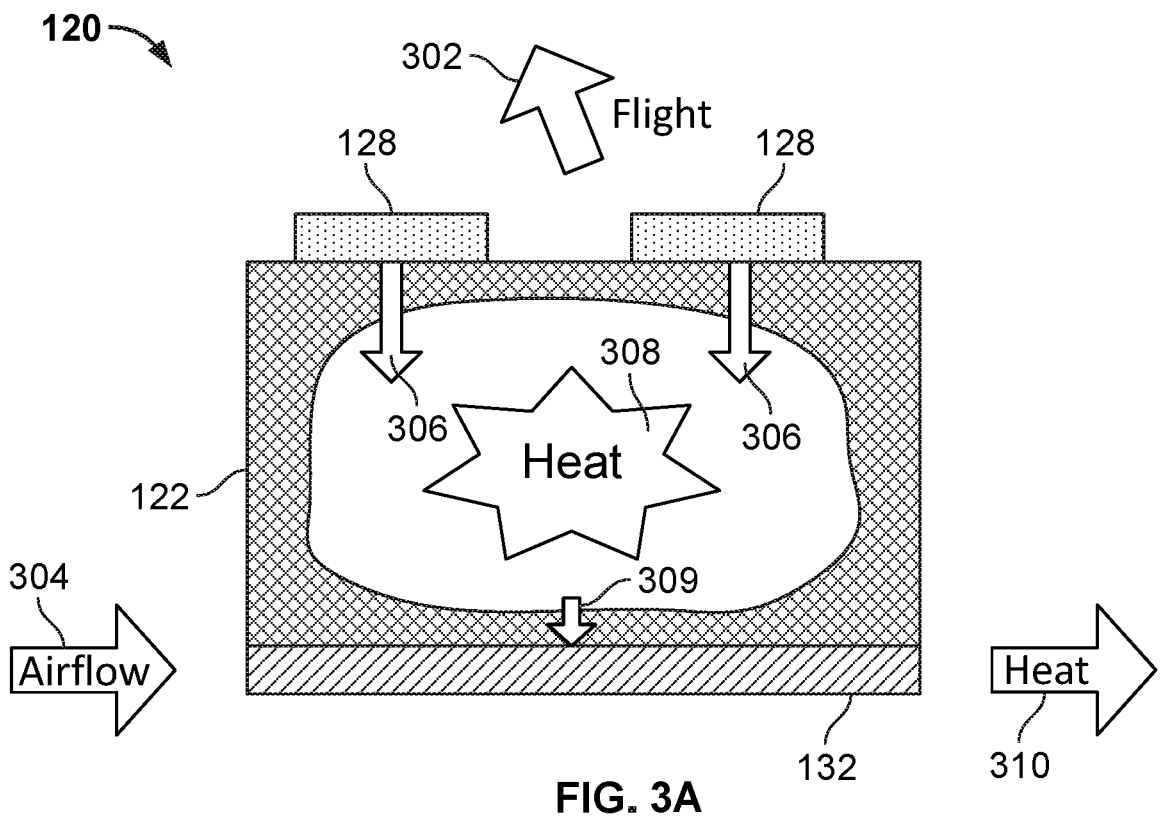
FIG. 3A is a diagram illustrating an embodiment of a coupled battery and motor controller thermal management system in a vertical flight mode of operation.

FIG. 3A is a diagram illustrating an embodiment of a coupled battery and motor controller thermal management system in a vertical flight mode of operation. In the example shown, the direction of flight of an electric aircraft embodying battery/motor controller assembly 120 of FIG. 1B is indicated by arrow 302. For example, during vertical takeoff an aircraft in which the battery/motor controller assembly 120 is included may have slight forward motion but primarily vertical motion. The airflow through the heat sink 132 under the conditions shown in FIG. 3A is represented by arrow 304. The relatively low amount of airflow 304 through heat sink 132 result, in this example, in the majority of waste heat 306 generated by the controllers 128 being conducted to the thermal mass of battery 122, resulting in an amount of heat 308 being transferred to the battery 122, which raises the internal temperature of battery 122. A relatively small amount of the heat 309, in this example, is conducted to the heat sink 132 from battery 122 and transferred to the environment in the form of the heated outlet airflow 310. In various embodiments, the heat sink 132 is designed such that most of the heat (306, 308) is conducted into and retained in the thermal mass of the battery, but some is transferred to the coolant air (304, 309, 310).

Figure 3B:
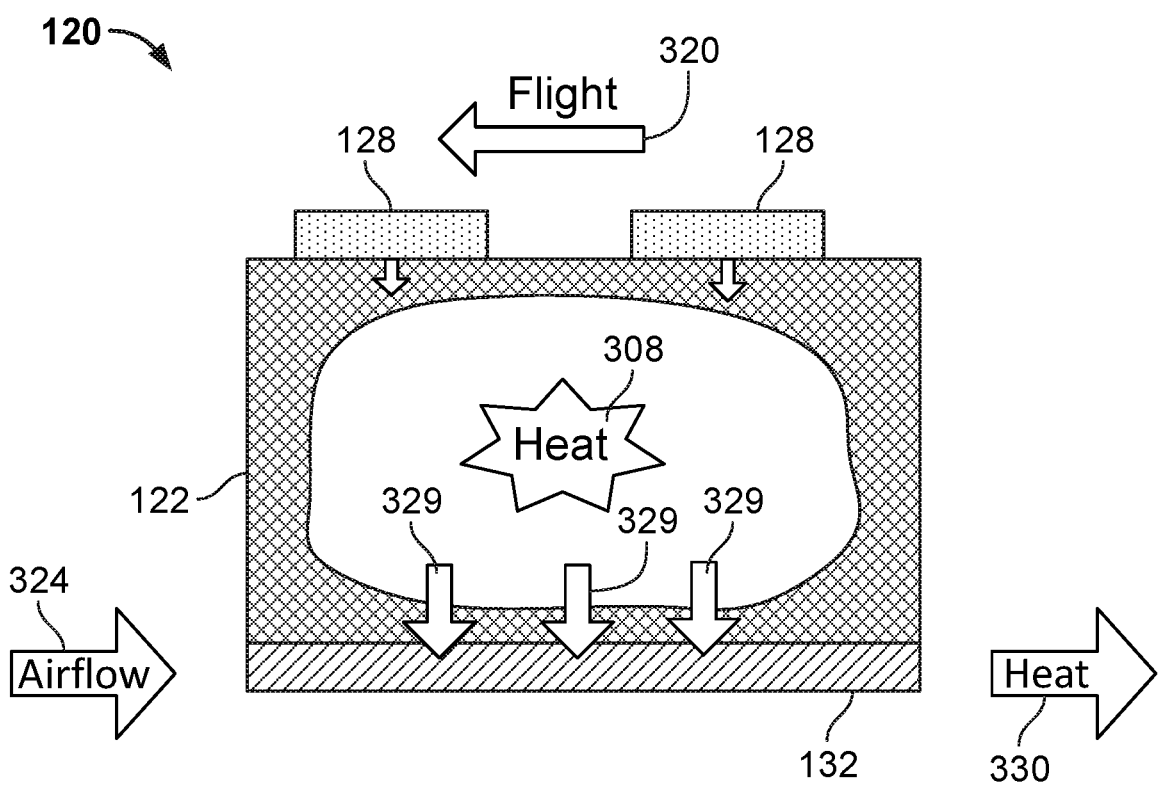
FIG. 3B is a diagram illustrating an embodiment of a coupled battery and motor controller thermal management system in a forward flight mode of operation.

FIG. 3B is a diagram illustrating an embodiment of a coupled battery and motor controller thermal management system in a forward flight mode of operation. In the example shown, the arrow 320 indicates the aircraft is in forward flight resulting in airflow 324 through heat sink 132. In the example shown, the lift fans are off and only residual heat is transferred to the cooling airflow via heat sink 132. The increase airflow 324 through heat sink 132 allows heat 308 in the thermal mass of battery 122 to be conducted 329 to the heat sink 132 and transferred to the cooling airflow through heat sink 132 and carried away in heated outlet airflow 330.

In various embodiments, motor controllers may be thermally coupled to a battery other than as shown in FIGS. 1A through 3B. For example, motor controllers may be mounted on surfaces other than the top surface of a battery. Likewise, a heat sink may be interposed between the motor controllers and the battery, or may be on the opposite or an adjacent or other side of the battery. While heat sinks 112 and 132 are fin-type heat exchangers, in various embodiments other types of heat sink and/or heat exchanger may be used.

Figure 4:
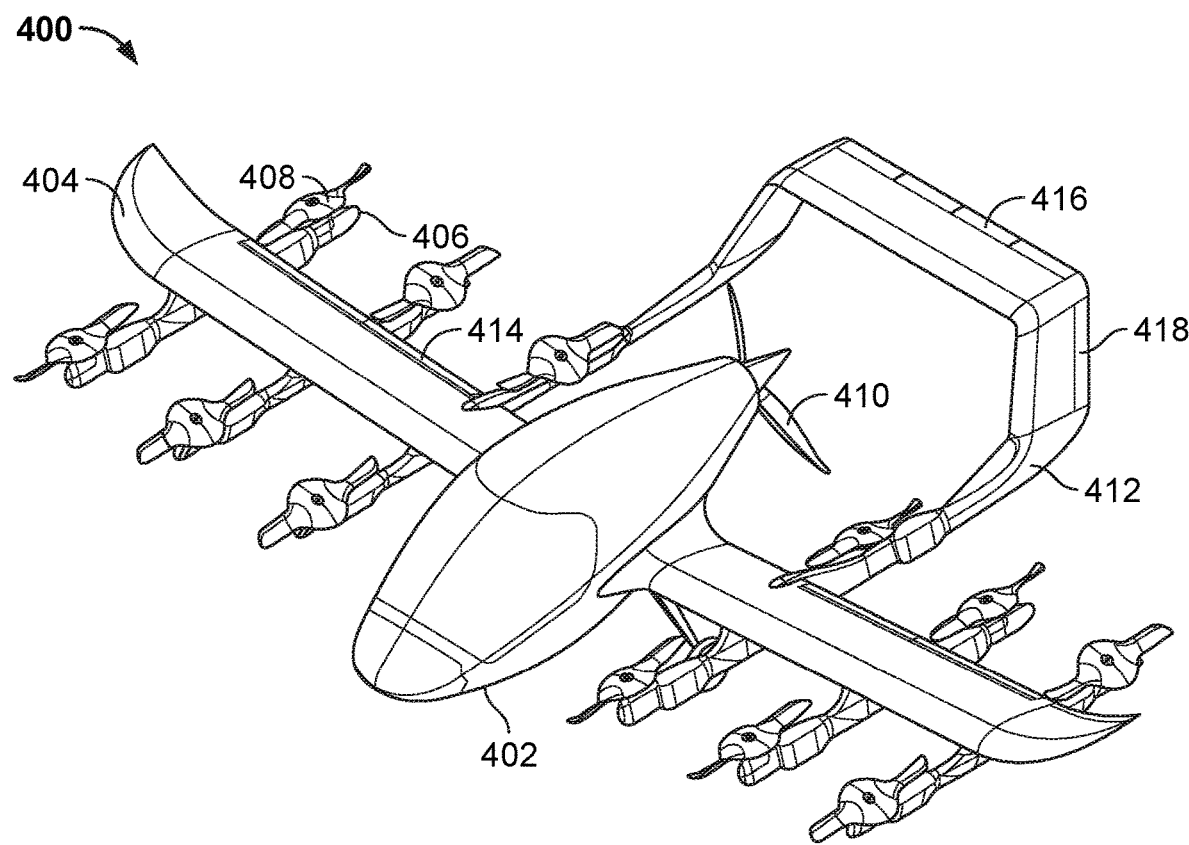
FIG. 4 is a diagram illustrating an embodiment of an electrically-powered aircraft.

FIG. 4 is a diagram illustrating an embodiment of an electrically-powered aircraft. In the example shown, aircraft 400 includes a fuselage 402 and wings 404. Three underwing mounting booms 406 are mounted under each wing 404, and on the forward and aft end of each mounting boom a lift fan 408 and associated motor (not shown) is mounted. A pusher type propeller 410 provides thrust for forward flight. Aircraft 400 includes tail structures 412 extending aft from the inboard booms 406. Flight control surfaces 414, 416, and 418 provide stability and control during forward flight.

In various embodiments, a battery/controller assembly in the center of the aircraft, e.g., in fuselage 402, controls and supplies required current to motors associated with and/or comprising lift fans 408. In various embodiments, during forward flight only propeller 410 is used and lift fans 408 are not used, resulting in their respective controllers not generating heat.

Figure 5:
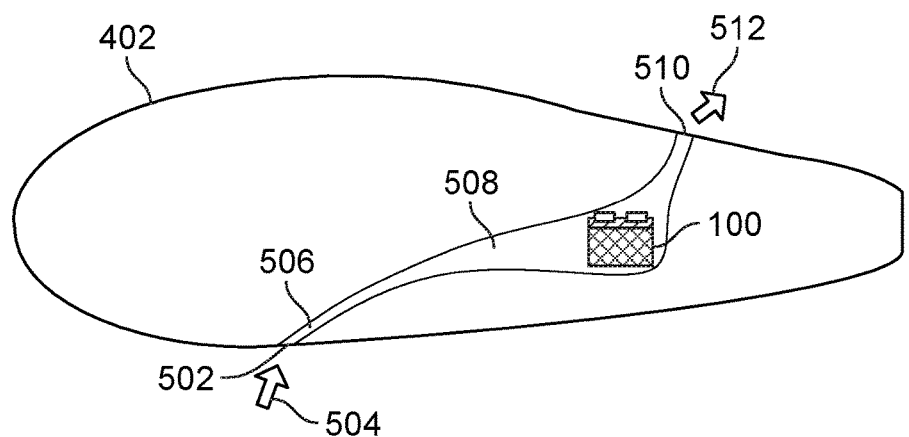
FIG. 5 is a diagram illustrating an embodiment of an electrically-powered aircraft fuselage in which a coupled battery and motor controller thermal management system is incorporated.

FIG. 5 is a diagram illustrating an embodiment of an electrically-powered aircraft fuselage in which a coupled battery and motor controller thermal management system is incorporated. In the example shown, battery/controller assembly 100 of FIG. 1A (having 12 controllers, one for each lift fan 408) is positioned in fuselage 402 in an airflow pathway that begins at an air inlet 502, e.g., a National Advisory Committee to Aeronautics (NACA) duct or inlet. Inlet 502 admits inlet airflow 504 to an inlet duct 506 leading to a cavity (enclosure, etc.) 508 in which the battery/controller assembly 100 is located. Air flows through one or more heat sinks comprising battery/controller assembly 100 and flows out of fuselage 402 via an outlet duct 510 as heated outlet airflow 512.

Techniques disclosed herein enable motor controller cooling to be achieved while minimizing aircraft (or other vehicle) weight.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An assembly, comprising:
   a battery having a thermal mass;
   a motor controller coupled thermally to the battery, wherein the motor controller generates more waste heat during a first mode of operation of the motor controller than during a second mode of operation of the motor controller; and
   a heat sink coupled thermally to the battery, the heat sink having a heat dissipation capacity that keeps at least a portion of the waste heat stored in the thermal mass of the battery during at least the first mode of operation of the motor controller, and releases at least the portion of the waste heat to flow out the battery during at least the second mode of operation of the motor controller.

2. The assembly of claim 1, wherein the motor controller is configured to control a motor associated with an aircraft.

3. The assembly of claim 1, wherein the motor controller is configured to generate at least 400 W of waste heat.

4. The assembly of claim 1, further comprising: additional motor controllers coupled to the battery, wherein the motor controller and the additional motor controllers are configured to generate at least 3.2 kW of waste heat.

5. The assembly of claim 1, wherein the heat sink is no heavier than 0.11 kg.

6. The assembly of claim 1, wherein the heat sink is positioned at least in part between the motor controller and the battery.

7. The assembly of claim 6, wherein the motor controller is mounted on a mounting plate comprising the heat sink.

8. The assembly of claim 1, wherein the heat sink is positioned at least in part on top of the battery.

9. The assembly of claim 1, wherein the heat sink includes a plurality of thermally conductive fins arranged in an array defining one or more airflow channels through the heat sink.

10. The assembly of claim 1, wherein the battery includes a plurality of battery cells.

11. The assembly of claim 10, wherein the battery cells are mounted within a battery enclosure of the battery and the battery cells are coupled thermally to the heat sink.

12. The assembly of claim 1, wherein the motor controller is mounted on a first surface of the battery and the heat sink is mounted on a second surface of the battery.

13. The assembly of claim 1, wherein the heat sink comprises an outer casing of one or both of the motor controller and the battery.

14. The assembly of claim 1, wherein the thermal mass of the battery is larger than a thermal mass of the motor controller.

15. The assembly of claim 1, wherein the battery and the motor controller of the assembly are those of an electric aircraft.

16. The assembly of claim 15, wherein the first mode of operation comprises one or more of vertical flight, take off, hover, and landing.

17. The assembly of claim 15, wherein the electric aircraft includes a plurality of lift fans, each of which has a corresponding motor controller.

18. The assembly of claim 17, wherein each motor controller is coupled thermally to the thermal mass of the battery.

19. The assembly of claim 1, wherein the motor controller is thermally coupled to the thermal mass of the battery by materials comprising a thermally conductive path.

* * * * *